United States Patent [19]

Vamvakas

[11] 4,284,189

[45] Aug. 18, 1981

[54] MULTIPLE BOTTLE CARRIER STRUCTURE

[75] Inventor: Michael Vamvakas, Rocky River, Ohio

[73] Assignee: Niagara Bottle Washer Manufacturing Co., a division of The Salangmack Company

[21] Appl. No.: 54,272

[22] Filed: Jul. 2, 1979

[51] Int. Cl.³ .............................................. B65G 17/32
[52] U.S. Cl. .................................... 198/647; 198/655; 229/28 BC; 294/159; 206/139
[58] Field of Search ............... 198/647, 646, 656, 655, 198/648, 681; 224/48 A, 48 C, 48 R; 294/87 A; 134/48, 70, 124

[56] References Cited

U.S. PATENT DOCUMENTS

| 781,839 | 2/1905 | Miller | 198/6-7 |
|---|---|---|---|
| 1,756,554 | 4/1930 | Hippenmeyer | 198/655 |
| 2,522,912 | 9/1950 | Weiss | 198/648 |
| 3,078,020 | 2/1963 | Boonstra | 224/48 R X |
| 3,101,834 | 8/1963 | Meyer | 198/647 |
| 3,981,389 | 9/1976 | Babunovil et al. | 198/655 |

Primary Examiner—James B. Marbert
Assistant Examiner—Douglas D. Watts
Attorney, Agent, or Firm—Baldwin, Egan, Walling & Fetzer

[57] ABSTRACT

A carrier for transportation of a plurality of bottles comprising a rigid rectangular frame enclosing a plurality of generally hexagonal forms, each form provided with a plastic liner for supporting a bottle while transporting the same through a bottle washing machine.

7 Claims, 13 Drawing Figures

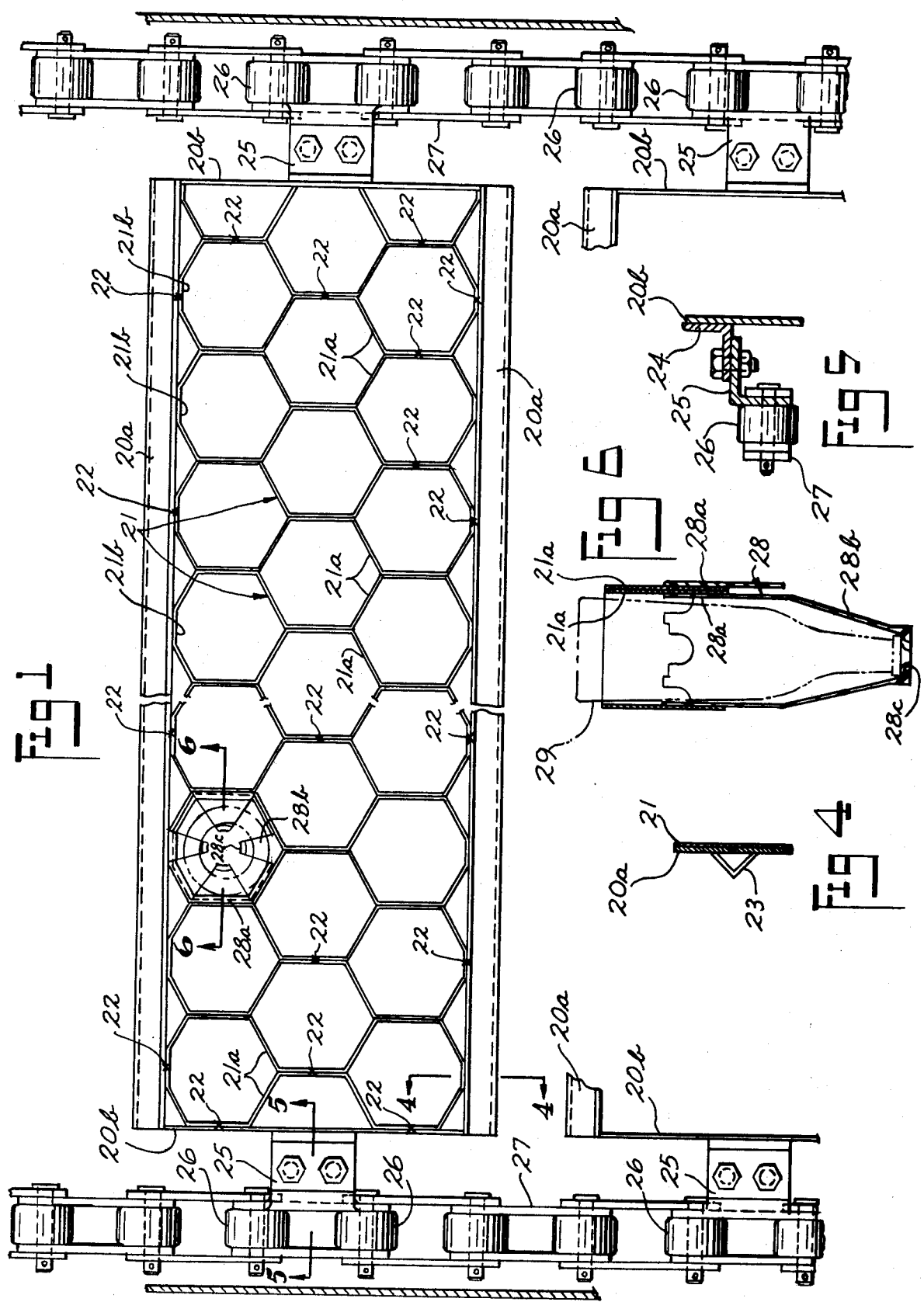

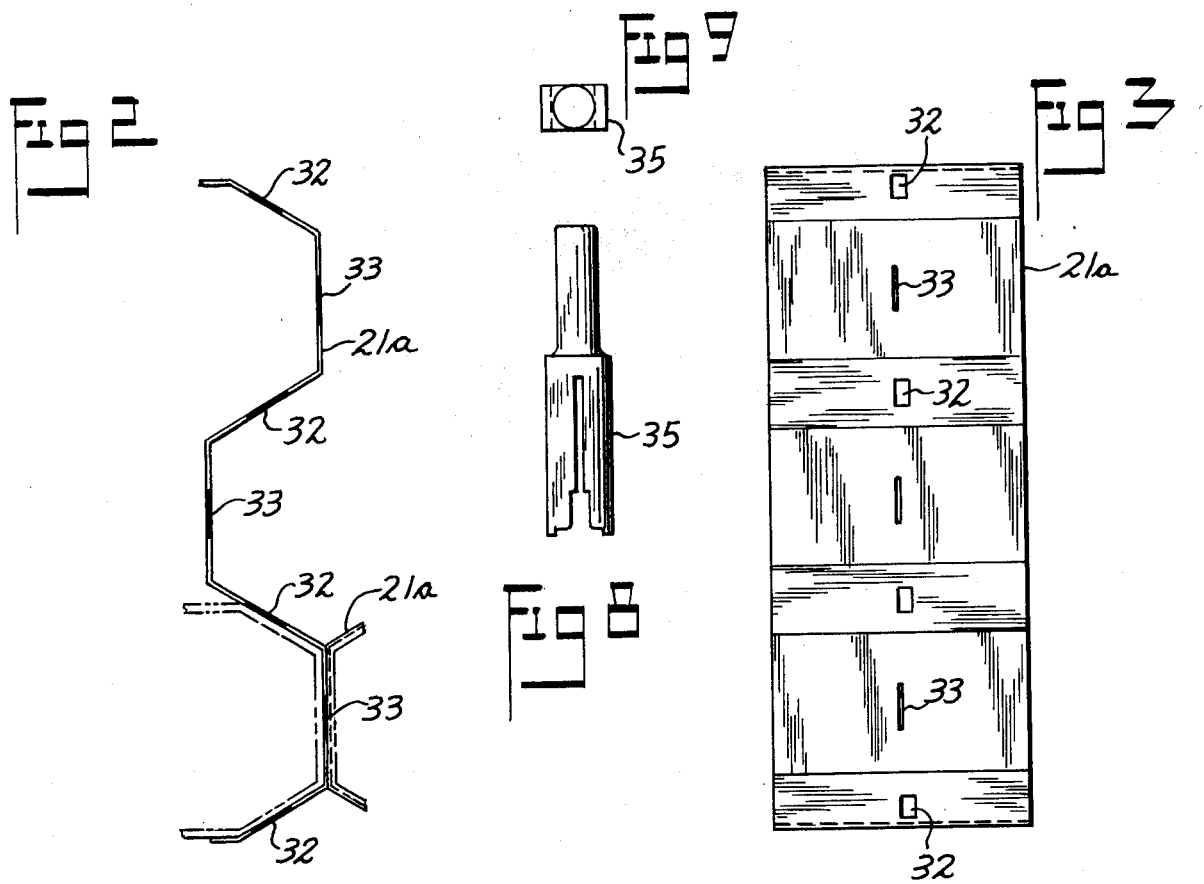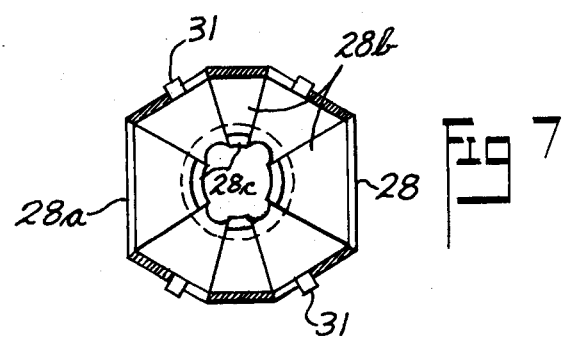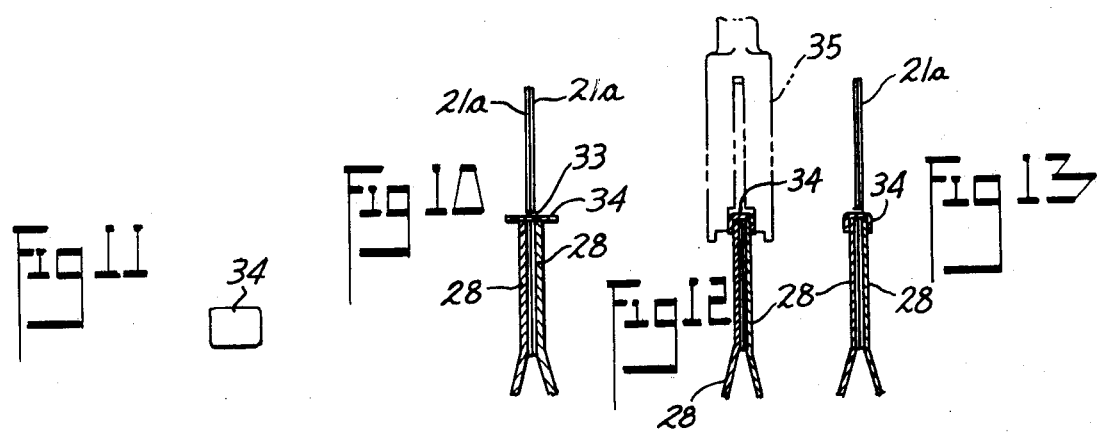

MULTIPLE BOTTLE CARRIER STRUCTURE

FIELD OF THE INVENTION

This invention is generally in the bottle washing machines classification, and specifically for a carrier for transporting a large number of bottles in a small space so that the bottles may be expeditiously handled into and out of the washing machine.

DESCRIPTION OF THE PRIOR ART

No prior art is known to this application which is specific to the carrier shown in the specification. The carrier shown herein is useful in connection with applicant's pending patent application Ser. No. 918,338, filed June 23, 1978 and in applicant's copending application Ser. No. 21,622, filed Mar. 19, 1979.

SUMMARY

This application fulfills a need for handling a large number of empty bottles in a small space in a carrier structure including a substantially rectangular frame having metal sides and ends and being longer than it is wide and usually having a height between about three and four inches. A honey-comb type structure substantially fills the frame with the contacting sides of these forms being welded together and to the frame. A plastic liner in each form is secured to the metal form and is of a length to encompass the bottle being handled.

The structure of the invention described herein is shown in the following drawings:

FIG. 1 is a top plan view of the carrier of this invention showing the honey-comb structure inside of a rectangular frame:

FIG. 2 is a top plan view of a plurality of steel plates bent for incorporation in this invention. Each of these individual plates extends generally crosswise of the narrower dimention of the holding frame and every other one of the individual plates is reversed whereby to form complete generally hexagon forms between adjacent plates;

FIG. 3 is a side elevational view taken from the right-hand side of FIG. 2;

FIG. 4 is a sectional view taken along the line 4—4 of FIG. 1;

FIG. 5 is a sectional view taken along the line 5—5 of FIG. 1;

FIG. 6 is a sectional view enlarged taken along the line 6—6 of FIG. 1;

FIG. 7 is a top plan view of the structure shown in FIG. 6;

FIG. 8 is an elevational view of a special tool used to bend a locking clip into locking position;

FIG. 9 is a top plan view of the device shown in FIG. 8;

FIG. 10 is a sectional view taken at the upper right-hand corner of FIG. 6;

FIG. 11 is a top plan view of the locking clip shown in unbent form in FIG. 10;

FIGS. 12 and 13 show the locking clip bent into its final locking position.

DESCRIPTION OF PREFERRED EMBODIMENTS

The carrier shown and described in this patent application may be used for bottles of various size and shape but the forms shown herein are specifically useful with a common shape of bottle having a cylindrical lower bottle portion about 2½ inches in diameter and having a length of 7 to 13 inches between the narrow neck and the wider bottom of the bottle.

It is obvious that the carrier of this invention might be used to handle bottles of similar structures so long as they were adapted to fit into the design of this carrier.

Referring to FIGS. 1, 2 and 3, the carrier disclosed herein has a generally rectangular frame 20 whose longitudinal sides 20a are longer than the end walls 20b. The frame walls are of generally uniform height and in this particular embodiment are about 3½ inches in height. As described herein, the frame 20 is of metal, usually steel. A honey-comb type of structure 21 substantially fills the rectangular frame. A preferred method of forming this honey-comb type structure is better understood with reference to FIGS. 2 and 3. This shows one of a plurality of individual steel plates 21a, each individual plate extending generally crosswise of the narrower dimension of the frame. FIG. 2 shows one of these plates 21a which shows half a hexagon opening toward the left joined to a half a hexagon turned to the right and then a third half of a hexagon turned to the left. Of course, the intermediate walls form parts of two hexagon forms. In making up the total honey-comb type structure, one of the plates 21a is turned in the direction shown in FIG. 2 and the next adjacent plate is turned in the opposite direction. This formation goes from end to end of the frame 20 when finally assembled as shown in FIG. 1. All of the plates 21a are welded to each other, the welds being indicated at 22. These welds occur between the abutting sides of adjacent plates 21a. For a strong construction, the honey-comb type forms along the longitudinal sides of the frame 20 are bent out of a true hexagonal wall form as shown at 21b so as to cause the wall at that position to extend a short distance parallel to the longitudinally extending frame side wall. There the parallel wall form portion is welded to the frame side wall.

As shown in FIG. 4, the longitudinal side walls of frame 20 are preferably strengthened by an angle iron form 23 opening toward the side wall 20a and extending the full length of each of said side walls and welded thereto giving a very strong structure.

Means is applied at each end of the frame 20 to relate the carrier to a flexible conveyor. This is shown in FIG. 5 where an angle iron 24 welded to the end wall 20b is bolted to an L-shape bracket 25 which extends longitudinally outwardly and then vertically downwardly and is there attached to a roller 26 which is carried by a chain link conveyor 27.

A plastic liner is provided in each of the generally hexagonal forms of the honey-comb type structure and each of these liners is secured to its surrounding metal form and is of a length to generally encompass the bottle intended to be handled. A liner 28 is best seen in FIGS. 6 and 7 and is also shown within one of the generally hexagonal forms in FIG. 1. In this embodiment these cells are of polypropylene but any plastic of a similar character might be used. Each plastic liner comprises a unitary piece of plastic having an upper generally octagonal shape 28a at its upper end of a size to fit closely in each of the generally sixsided forms of the honey-comb type structure, one of which is seen in FIG. 1. About half-way down the length of the liner 28 all of the sides of the liner are bent inwardly to a lower frustropyramid shape 28b extending downwardly and terminating at a bottom opening 28c which is slightly less than the size of the neck of a bottle to be handled by the carrier. One such bottle is shown in dot-dash lines at 29 in FIG. 6.

Each liner 28 has a plurality of projections 30 extending upwardly from its upper edge, four such projections being shown here. As shown in FIGS. 6 and 7, each of these projections has a short lug 31 at its upper end extending radially outwardly. As shown in FIGS. 2 and 3, there are suitable receiving openings 32 extending through the wall form 21a in a position to receive these lugs 31 in snapped-in condition. The flexibility of the polypropylene permits such positioning of the lugs 31 in the openings 32 when the parts are assembled.

A further fastening of each liner in the hexagonal forms 21 is shown in FIGS. 10, 11, 12 and 13. FIG. 3 shows narrow slots 33 in the hexagon forming plates 21a, these slots 33 being positioned at the level of the upper edge of the liners as seen in FIGS. 6 and 10. A small locking clip 34, shown in FIG. 11 consists of a small rectangular piece of thin steel plate. This locking clip 34 is passed through the openings 33 into abutting hexagonal forms 21a just above the upper edges of the plastic liners 28 as seen in FIG. 10. Then, a special locking tool of the general form shown in FIG. 8 at 35 is positioned as shown in FIG. 12 and brought forcibly downward to bend the opposite ends of a locking clip 34 downwardly against the sides of the liners 28, thus giving a finished position as shown in FIG. 13.

This locking clip forms an efficient manner of fixing the liners in proper position and if the user of the carrier is supplied with a tool like that shown at 35, he can then replace any liner 28 when that is necessary.

There is thus disclosed a manner of handling a large number of bottles in a single compact mass through a bottle washing machine which has not been possible before. In the prior art a row of bottles in a single row in a carrier was mounted with the carriers about 4½ inches between centers along a flexible conveyor. This took care of three times the number of bottles in each row in a traveling length of 13½ inches. With my new construction the carriers as disclosed herein can be arranged along the conveyor at distances of 1¾ inches between adjacent carriers. Each carrier is about ten inches across the narrower dimension and this would supply three times the number of bottles in a given distance along the transportation conveyor in a distance of about 11½ inches as against the previous distance of 13½ inches for a smaller number of bottles.

What is claimed is:

1. A carrier for transportation of a plurality of bottles, comprising a substantially rectangular frame having metal sides and ends and being longer than it is wide and having a height between about 3 and 4 inches, a honey-comb type structure substantially filling said frame, said structure including a plurality of tightly assembled rows of generally six-sided forms, the contacting sides of said forms with each other and with said frame being firmly and permanently attached, and means at each end of said frame to relate said carrier to a flexible conveyor, said forms being of metal and of a height to enclose a good portion of a wider generally cylindrical part of a bottom of a bottle, and a plastic liner in each form secured to said metal form and of a length to encompass said bottle.

2. A carrier for transportation of a plurality of bottles, comprising a substantially rectangular frame having metal sides and ends and being longer than it is wide and having a height between about 3 and 4 inches, a honey-comb type structure substantially filling said frame, said structure including a plurality of tightly assembled rows of generally six-sided forms, the contacting sides of said forms with each other and with said frame being firmly and permanently attached, and means at each end of said frame to relate said carrier to a flexible conveyor, said honey-comb type structure including a plurality of rows of generally hexagon steel plate forms assembled in said frame with abutting sides of said forms normal to the longer sides of said frame, and there welded together, said honey-comb type structure being formed of a plurality of individual steel plates, each individual plate shaped to form onehalf of three hexagons in a row extending generally crosswise of the narrower dimension of said frame, every other one of said individual plates being reversed whereby to form complete generally hexagon forms between adjacent plates.

3. A carrier as defined in claim 2, wherein said generally hexagonal forms abut said longitudinally extending frame side walls and there have a true hexagonal wall bent to extend a short distance parallel to said longitudinally extending frame side wall, and there said parallel form wall portion being welded to said frame side wall.

4. A carrier as defined in claim 1, wherein each plastic liner comprises a unitary piece having an upper generally octagonal shape of a size to fit closely within each of said generally sixsided forms, and a lower frustro-pyramid shape extending downwardly from said octagonal shape and terminating at a bottom opening less than the neck of a bottle to be handled by said carrier.

5. A carrier as defined in claim 4, wherein said generally octagonal shape and said frusto-pyramid shape each extends for about one-half of the total length of said liner.

6. A carrier as defined in claim 4, wherein each of said plastic liners has the flexibility of polypropylene, each of said liners having a plurality of projections extending upwardly from its upper edge, a plurality of said projections having short lugs extending radially outwardly, and there being receiving openings in said generally six-sided forms in position to receive said lugs in a snapped-in condition.

7. A carrier as defined in claim 4, wherein at the level of the upper edge of each liner there are provided small openings through abutting sides of said generally six-sided forms, and a locking clip is passed through said openings and abutting said liner upper edge and said clips bent down against said abutting sides.

* * * * *